US008322846B2

(12) United States Patent
Smoyer et al.

(10) Patent No.: US 8,322,846 B2
(45) Date of Patent: Dec. 4, 2012

(54) SYSTEM AND METHOD FOR PROVIDING MULTIPLE USES OF PRINTER COVERSHEETS

(75) Inventors: Clinton J. Smoyer, Raymore, MO (US); Jade D. Kerr, Kansas City, MO (US); Michael P. Morrissey, Overland Park, KS (US); Andrew V. Cook, Lenexa, KS (US); Mohit Mathur, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 909 days.

(21) Appl. No.: 12/403,796

(22) Filed: Mar. 13, 2009

(65) Prior Publication Data

US 2010/0231677 A1 Sep. 16, 2010

(51) Int. Cl.
*B41J 2/01* (2006.01)
*G06K 1/00* (2006.01)
*G06F 15/00* (2006.01)

(52) U.S. Cl. .......... 347/107; 358/1.9; 358/450; 358/1.2; 347/101; 235/375; 270/1.01; 399/401

(58) Field of Classification Search .................. 358/1.1, 358/1.9, 1.11–1.18, 400–404, 450, 1.2; 399/45, 399/401, 381, 389, 396; 380/54; 270/1.01, 270/58.31; 271/9, 9.06; 347/101–107
See application file for complete search history.

(56) References Cited

U.S. PATENT DOCUMENTS 5,316,279 A * 5/1994 Corona et al. .............. 270/1.01
5,435,601 A 7/1995 Casari
6,000,615 A * 12/1999 Spitz ....................... 235/462.01
7,835,026 B2 * 11/2010 Suzuki ........................ 358/1.18
7,843,597 B2 * 11/2010 Martinez ....................... 358/1.2

* cited by examiner

*Primary Examiner* — Twyler Haskins
*Assistant Examiner* — Chad Dickerson
(74) *Attorney, Agent, or Firm* — Swanson & Bratschun, L.L.C.

(57) ABSTRACT

A method for providing multiple uses of printer coversheets comprises providing a printer having a dedicated coversheet tray, a document sheet tray, and a scanning device, and receiving a print command from a user with an associated username. The method includes drawing a coversheet from the dedicated coversheet tray to be positioned adjacent the printed file, the coversheet having a plurality of predetermined username positions and a corresponding plurality of predetermined barcode positions. The method further includes performing a barcode scan of the coversheet, determining at which username position to print the username based on the results of the barcode scan, and printing the username at the next-available username position. The method also includes printing a barcode on the coversheet at the one of the barcode positions which corresponds to the username position at which the username is printed.

20 Claims, 10 Drawing Sheets

SYSTEM AND METHOD FOR PROVIDING MULTIPLE USES OF PRINTER COVERSHEETS

FIELD OF THE INVENTION

The present disclosure relates generally to printer coversheets and more particularly pertains to a system and method which provide multiple uses of printer coversheets.

BACKGROUND OF THE INVENTION

In many environments, multiple users rely on the same printing device for their printing needs. Printers designed for utilization by more than one user are often configured to provide a coversheet in front of each separate printed file to provide for easier retrieval by users of their particular printed files. In many situations, a username is printed on the coversheet so that the printed file can be easily identified by the user and allows multiple users to use the same printing device without mixing up printed files.

In these situations, there is typically a single coversheet used per printed file. After retrieval of the printed file, the coversheet is often discarded, creating a large amount of paper waste in many situations which has a negative impact on the environment and can be quite costly.

There is therefore a need for a system and method for reusing a coversheet multiple times to address these and other needs.

SUMMARY OF THE INVENTION

In certain embodiments, a method for providing multiple uses of printer coversheets comprises providing a printer having a dedicated coversheet tray, at least one document sheet tray, and a scanning device, and receiving a print command from a user through the user's computer device. In certain embodiments, the user has a corresponding username, the username is associated with the print command, and the command instructs the printer to print a file. The method includes drawing a coversheet from the dedicated coversheet tray to be positioned adjacent the printed file, the coversheet having a plurality of predetermined username indication positions at which the printer is operable to print usernames corresponding to print commands and a corresponding plurality of predetermined barcode positions at which the printer is operable to print barcodes. The method further includes performing a barcode scan of at least one barcode printed on the coversheet, determining at which username indication position to print the username on the coversheet based on the results of the barcode scan, and printing the username at the next-available one of the username indication positions on the coversheet based on the determination. Additionally, the method includes printing a barcode on the coversheet at the one of the barcode positions which corresponds to the username indication position at which the username is printed.

In other embodiments, a method for providing multiple uses of printer coversheets comprises providing a printer having a dedicated coversheet tray, at least one document sheet tray, and a scanning device, receiving a print command from a user through the user's computer device, the user having a corresponding username, the username being associated with the print command, and the command instructing the printer to print a file. The method includes drawing a coversheet from the dedicated coversheet tray to be positioned adjacent the printed file, the coversheet having a plurality of predetermined username indication positions at which the printer is operable to print usernames corresponding to print commands and a corresponding plurality of predetermined barcode positions at which the printer is operable to print barcodes. The method further includes the device performing a barcode scan of the barcode positioned in the last-occupied one of the predetermined barcode positions, the barcode representing data corresponding to the number of usernames previously printed on the coversheet, and determining which is the next-available username indication position based on the information encoded in the scanned barcode. The method also includes printing the username at the next-available one of the username indication positions and printing a barcode on the coversheet at the one of the barcode positions which corresponds to the next-available username indication position at which the username is printed.

In yet other embodiments, an apparatus comprises a device encoded with logic executable by one or more processors to receive a print command to print a file, the command having an associated username, and direct that a coversheet be drawn from a dedicated coversheet tray to be positioned adjacent the printed file. The device is able to perform a barcode scan of at least one barcode printed on the coversheet and determine the position at which to print the username on the coversheet based on the results of the barcode scan. Additionally, the device is able to direct the printing of the username on the coversheet at the determined location and direct the printing of a barcode corresponding to the determined location of the printed username on the coversheet.

DESCRIPTION OF ILLUSTRATED EMBODIMENTS

For the purposes of promoting an understanding of the principles of the disclosure, reference will now be made to the embodiments illustrated and specific language will be used to describe the same. It will nevertheless be understood that no limitation of the scope of the disclosure is thereby intended, such alterations, modifications, and further applications of the principles of the disclosure being contemplated as would normally occur to one skilled in the art to which the disclosure relates.

The present disclosure is generally directed to systems and methods for providing multiple uses of printer coversheets. Usernames are often printed on coversheets to enable proper retrieval of the printed file by the particular user who initiated the printing. In certain embodiments, the printer may also print a barcode on the coversheet corresponding to the printing of the username. After retrieval of the printed file, the coversheet may be placed back into a dedicated coversheet tray in the printer to allow for reuse of the coversheet. The printer may be equipped with a scanning device operable to scan one or more of the barcodes already printed on the coversheet to determine where to print the next username, such as on the next-available blank line of the coversheet, to give just one example.

As used herein, the term "barcode" is intended to broadly encompass any printed item that may be scanned and which will indicate some amount of information to the device that scans the barcode. For example, the "barcode" may be a standard barcode comprising a plurality of vertical lines of varying thicknesses making up a coded number, such as code 128, code 39, UPC A, UPC E, EAN 13, JAN 13, EAN 8, JAN 8, Interleaved 2 of 5, Matrix 2 of 5, Industrial 2 of 5, Codabar, Plessey, and Code 11, but the barcode may additionally comprise two-dimensional barcodes, or even predetermined printed shapes appearing at various locations upon the coversheet, just to name a few non-limiting examples.

Figure 1:
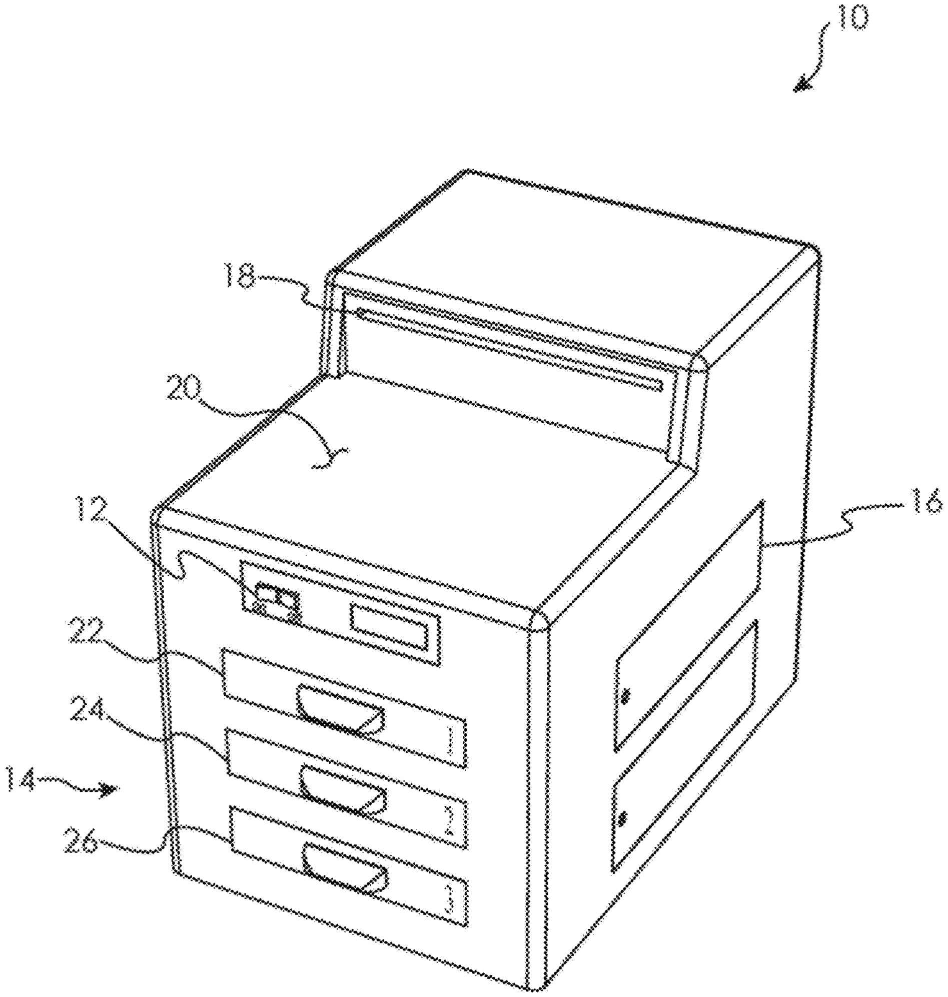
FIG. 1 is a perspective view of a printer according to an embodiment of the present disclosure.

FIG. 1 illustrates an example printer which may be utilized in accordance with the presently-disclosed systems and methods. As shown, printer 10 includes an on/off power switch 12, one or more paper trays 14 and one or more maintenance drawers 16. Additionally, printer 10 may include a paper exit opening 18 and a paper ledge 20 on which printed files are distributed. As an example, paper trays 14 may include a document sheet tray 22, a letterhead tray 24 and a dedicated coversheet tray 26. It should be appreciated that the representation of the example printer 10 is for illustrative purposes and is not intended to be a detailed depiction showing all the components of a printer. Additionally, the components of the printer which are shown are represented in simplified form for ease of understanding. Accordingly, the printer 10 may be arranged, designed and/or configured in a variety of other appropriate manners as would occur to one of ordinary skill in the art. Additionally, other appropriate printing devices may be used in accordance with the systems and methods contemplated by the present disclosure as would occur to one of ordinary skill in the art, with printer 10 being just one non-limiting example.

Figure 2:
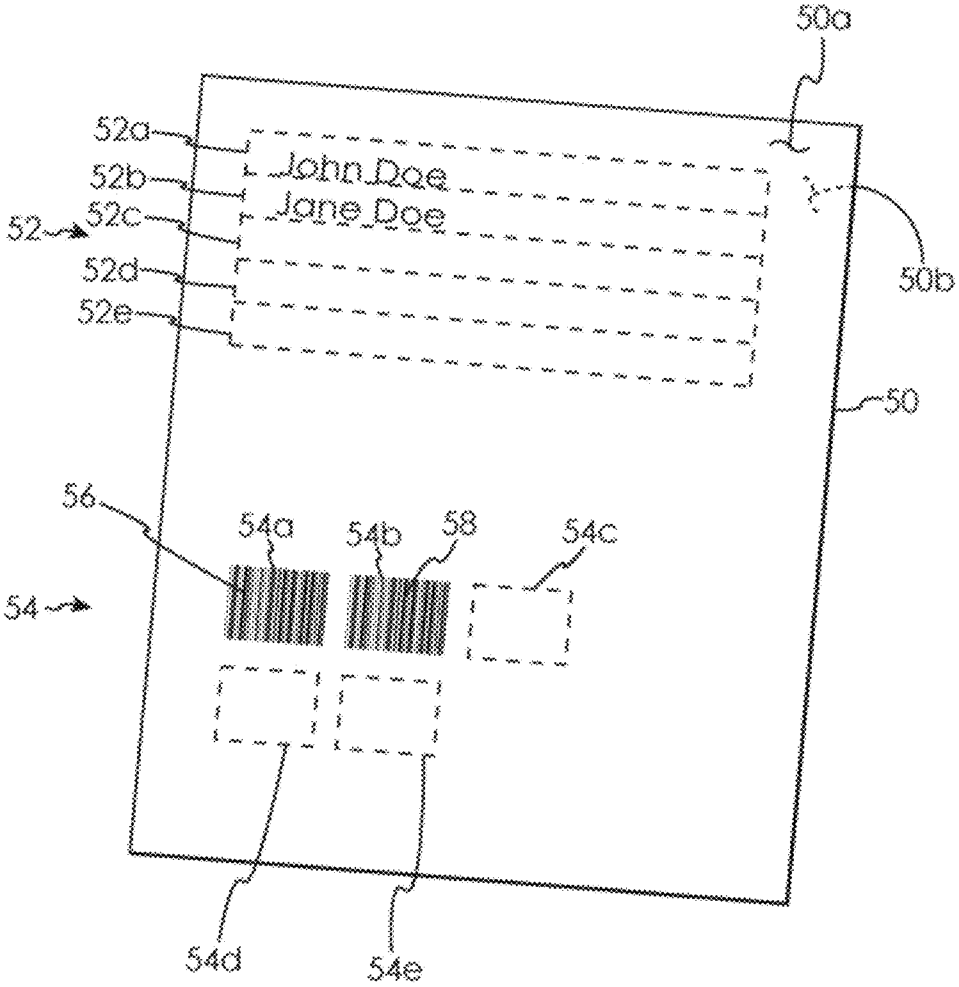
FIG. 2 is a front view of a coversheet according to an embodiment of the present disclosure.

FIG. 2 illustrates an example coversheet 50 which can be reused in printer 10. The coversheet 50 has a first side 50*a* and a second opposite side 50*b*. In certain embodiments, first side 50*a* includes a plurality of predetermined username indication positions 52 and a corresponding plurality of predetermined barcode positions 54. In certain embodiments, the same number of username and barcode positions is provided. In the specific illustrated embodiment, there are five username indication positions 52*a* through 52*e* positioned near the top of coversheet 50 and five corresponding barcode positions 54*a* through 54*b* near the bottom of coversheet 50. It should be appreciated that coversheets utilized in accordance with the present disclosure may include greater or fewer than 5 corresponding username and barcode positions. Additionally, it should be appreciated that the same, greater or fewer number of username and barcode positions may be included on second side 50*b* of coversheet 50. In certain embodiments, the username indication positions 52 may be vertically aligned in one or more columns, while the barcode positions may be horizontally aligned in one or more rows. However, it should be appreciated that the arrangement and configuration of the username and barcode positions is not critical to the present disclosure.

Barcodes, such as example barcodes 56 and 58, may be printed in the predetermined barcode positions 54 corresponding to the printing of the example usernames "John Doe" and "Jane Doe" in the username indication positions 52. As an example, the printer 10 may print the barcode 58 at position 54*b* on the coversheet 50 directly before, directly after or simultaneously with the printing of the username "Jane Doe" in username indication position 52*b*. The barcodes printed on the coversheet 50 may be identical, may be unique to or otherwise correspond the particular username printed on the coversheet along with the barcode, may correspond to the number of usernames printed on the coversheet, and/or may correspond to the last-occupied username indication position in which the most recently added username was printed, as non-limiting examples. Accordingly, there are numerous possible ways, many of which will be discussed in greater detail below with respect to the flowcharts in FIGS. 4-9, in which the barcodes may indicate to the printer where to print the next username on the coversheet. Alternatively, other appropriate data representations which are machine or human-readable may be printed on the coversheets as would occur to one of ordinary skill in the art.

The printer device used in accordance with the presently-disclosed methods, such as printer 10, may include a scanning device operable to read the barcodes and retrieve the data encoded within the barcodes. The scanning device incorporated into the printer may be any appropriate scanning device as would occur to one of ordinary skill in the art, such as a conventional barcode scanner. In certain embodiments, the scanning device may be incorporated into a computer device having at least one processor and at least one type of memory. The processor and memory may be conventional, integrated components operable to communicate with each other. In a particular embodiment, the computer device incorporated into the printer may include operating logic stored in the memory component, with the processor being operable to execute the operating logic. One of ordinary skill in the computer art will appreciate that the functionality, components and/or devices described herein can be configured and arranged in variety of possible manners and still be within the scope of the invention.

Figure 3:
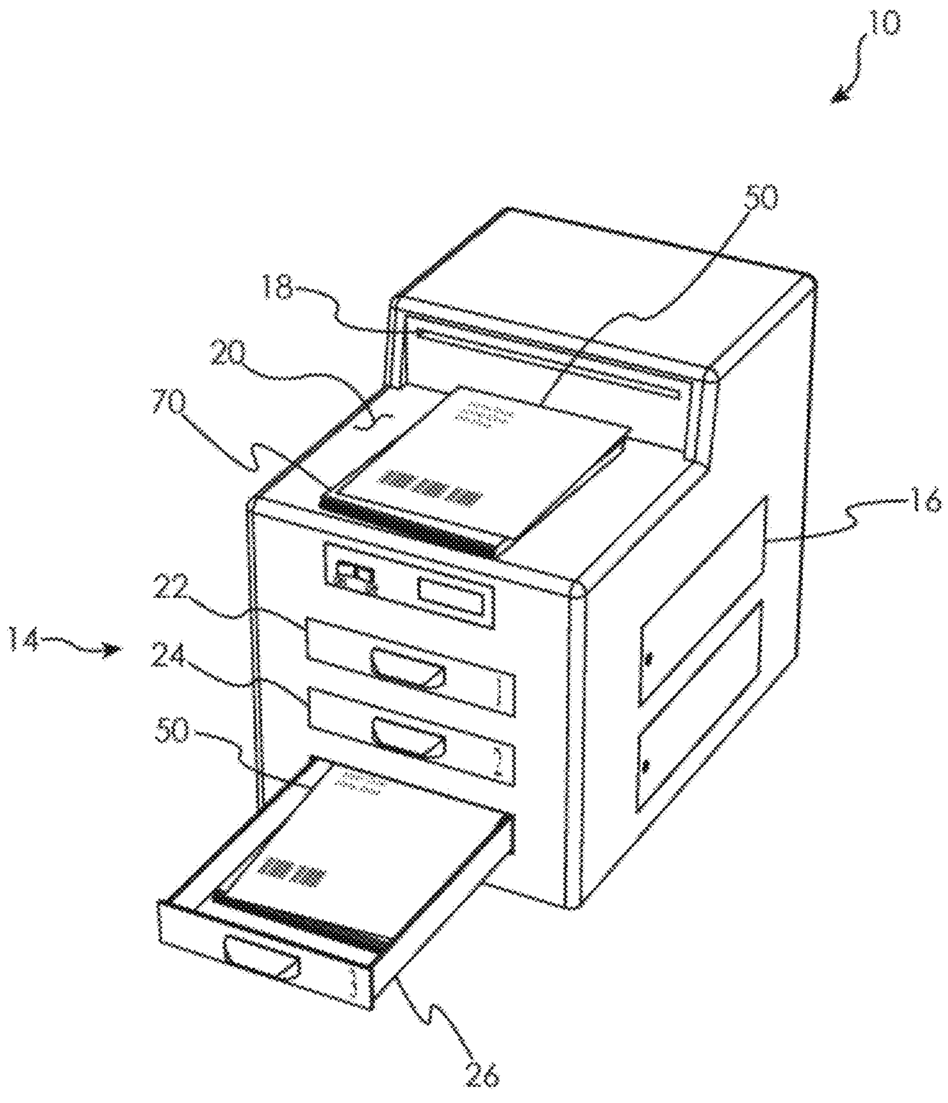
FIG. 3 is perspective of the printer of FIG. 1 and coversheet of FIG. 2.

As illustrated in FIG. 3, after the username "Jane Doe" and the corresponding barcode 58 have been printed in username indication position 52*b* and barcode position 54*b*, respectively, and the printed file has been retrieved, coversheet 50 may be returned to dedicated coversheet tray 26. Thereafter, the printer may draw coversheet 50 from tray 26 to reuse the coversheet with respect to another printed file. In certain embodiments, the printer may print the new username, shown as "Jim Doe" in the illustrated example, in next-available username indication position 52*c* and a corresponding barcode in the next predetermined barcode position 54*c*. The printer may also print the document file on sheets 70 drawn from another tray in the printer 10, such as tray 22, either before or after printing occurs on the coversheet 50. In some embodiments, coversheet 50 is positioned on top of, in front of, or otherwise adjacent the printed document to enable proper retrieval by the user associated with the username "Jim Doe." It should be appreciated that the particular coversheet 50 would only be positioned in one of tray 26 or on ledge 20 at a particular time, but is shown in both positions in FIG. 3 for illustration purposes.

Figure 4:
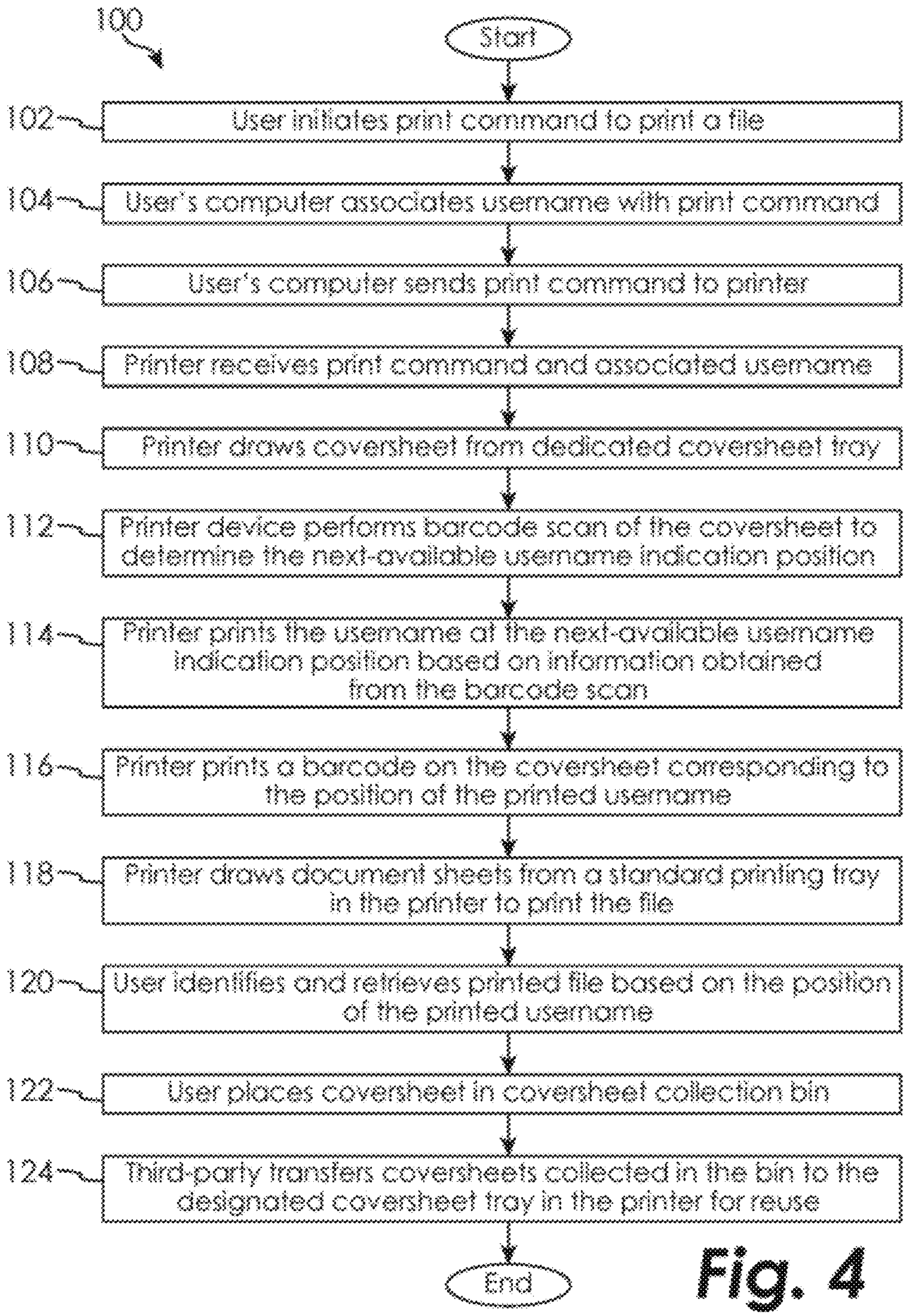
FIGS. 4-9 are flowcharts describing methods of reusing printer coversheets according to embodiments of the present disclosure.
Figure 5:
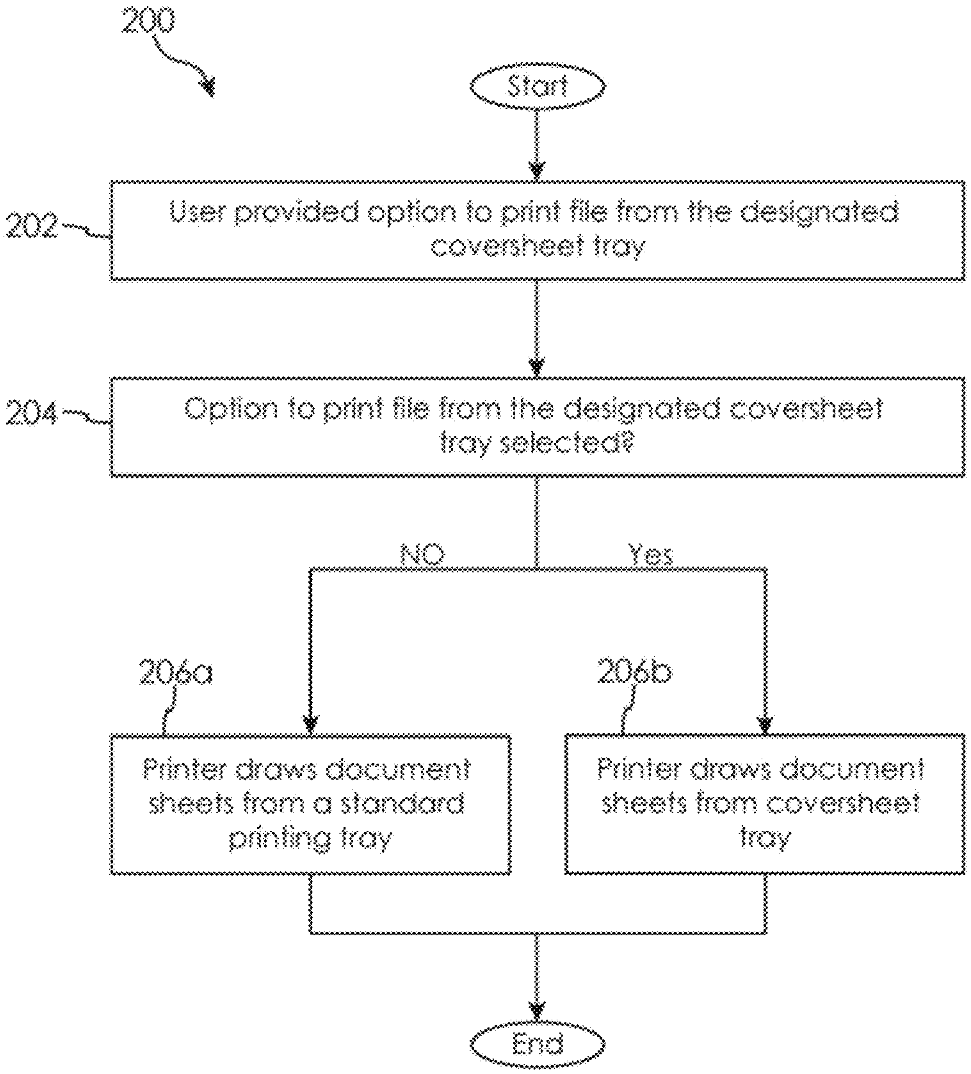

FIGS. 4-9 are flowcharts representing various example methods of reusing a printer coversheet according to the present disclosure. More specifically, the flow chart shown in FIG. 4 provides an overview of an example method contemplated by the present disclosure and the flow chart shown in FIG. 5 provides an optional step for the methods contemplated by the present disclosure. Additionally, the flowcharts shown in FIGS. 6A-9 represent example ways in which the barcodes can indicate to the printer where the next username should be printed on the coversheet. It should be appreciated that the timing and/or order of the steps in the flowcharts can be varied as would occur to one of ordinary skill in the art.

The method 100 shown in FIG. 4 begins with the user initiating a print command to print a file from the user's computer at step 102. In certain embodiments, the user has a unique username associated with the user by the user's computer. The computer may associate the unique username with the print command at step 104. At step 106, the user's computer sends the print command to a printer device, such as printer 10 as one non-limiting example. It should be understand that the particular manner in which the print command is initiated, the username is associated therewith, and the print command is transferred to the printer are not critical to the present disclosure.

At step 108, the printer device receives the printer command with the associated username from the user's computer. Before or after receiving the print command, the printer may draw a coversheet, such as coversheet 50, from the dedicated coversheet tray 26 at step 110. At step 112, the printer device performs a barcode scan to look for one or more barcodes previously printed on the coversheet with the internal scanning component. Based on the information received from the barcode scan, at step 114 the printer prints the username at the next-available username indication position. In the particular illustrated embodiment, the printer may print the username "Jim Doe" at position 52*c* based on the results of the barcode scan. At step 116, the print correspondingly prints a barcode on the coversheet corresponding to the position of the printed username. In the particular illustrated embodiment, the printer may print a barcode at position 54*c* corresponding to username position 52*c*. The printer may print the corresponding username and barcode simultaneously or in any order as would occur to one of ordinary skill in the art.

Before or after the printer prints the username and barcode at steps 114 and 116, the printer draws document sheets from a standard printing tray at step 118, such as tray 22 for example, to print the file. Once the file is printed, the user retrieves the printed file from the printer at step 120. To properly retrieve the file, the user checks the coversheet to determine if the user's username is the last printed username on the coversheet. In the particular illustrated embodiment, the last printed username will be the username printed at the bottom of the vertically-aligned list of usernames, and thus the username printed closest to the bottom of the coversheet. Upon retrieving the printed file, at step 122 the user may place the coversheet in a coversheet collection bin positioned near the printer. Alternatively, the user may return the coversheet directly to the dedicated coversheet tray, such as tray 26. At step 124, the user or a third-party transfers the used coversheets which have been collected in the collection bin to the dedicated coversheet tray in the printer for reuse, such as tray 26 in printer 10.

In the particular illustrated embodiment, each side of the coversheet 50 allows for five uses corresponding to the five predetermined username indication positions 52*a* through 52*e* and the five predetermined barcode positions 54*a* through 54*e*. However, it should be appreciated that greater or fewer than five uses per side of the coversheet is contemplated by the present disclosure. In certain embodiments, if the maximum number of usernames and corresponding barcodes has been printed on a particular side of the coversheet, the user or a third-party transferring the coversheet to the dedicated coversheet tray may flip the coversheet over so that the opposite side may be used. In other embodiments, the printer may be operable to determine if the maximum number of usernames and corresponding barcodes has been printed on a particular side of the coversheet and flip the coversheet over and/or print the next username and barcode on the opposite side of the coversheet. In the event that both sides of the coversheet contain the maximum number of printed usernames and barcodes, the printer may be operable to transfer the coversheet to a discard tray so that the coversheet may be discarded as appropriate.

The method 200 shown in FIG. 5 provides for an optional step which may be incorporated into one or more of the presently-disclosed methods. Many of the remaining steps involved in the method have been omitted from FIG. 5 for clarity. According to method 200, after the user has initiated a print command, the user may optionally be provided the option to print the entire selected file on paper from the dedicated coversheet tray, such as tray 26 for example. In certain embodiments, the user may desire to print certain files, such as non-business critical documents for example, on reused paper, such as reused coversheets placed in the dedicated coversheet tray. In this way, old paper may be reused via the designed coversheet tray. If the user selects the option to print the file from the dedicated coversheet tray at step 204, the printer will draw the document sheets for the printing of the file from the dedicated coversheet tray, along with the coversheet itself. If the user does not choose to print the file from the dedicated coversheet tray at step 204, the printer will draw the document sheets on which to print the file from a standard document sheet tray, such as tray 22 for example. In this way, the user is given the option of printing low-priority or informal document files on reused coversheets rather than new document sheets placed in the standard document tray in the printer.

As mentioned above, the flowcharts shown in FIGS. 6A-9 represent example ways in which the barcodes can indicate to the printer where to print the next username on the coversheet. The flowcharts shown in FIGS. 6A-9 include many of the same or similar steps as previously discussed with respect to method 100 shown in FIG. 4. Accordingly, such repeated steps will not be discussed again with respect to the methods in FIGS. 6A-9 for the sake of brevity.

Figure 6A:
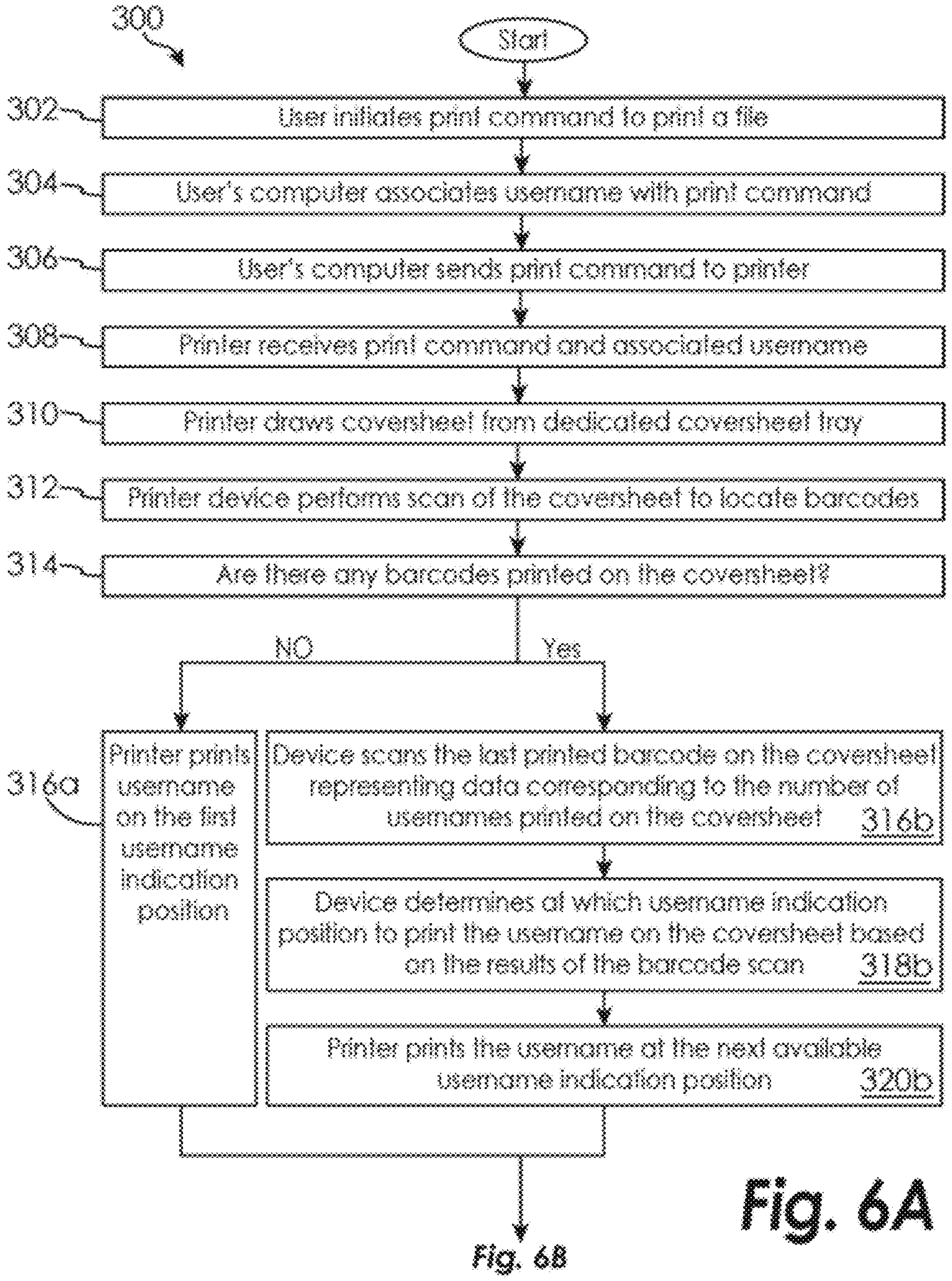
Figure 6B:
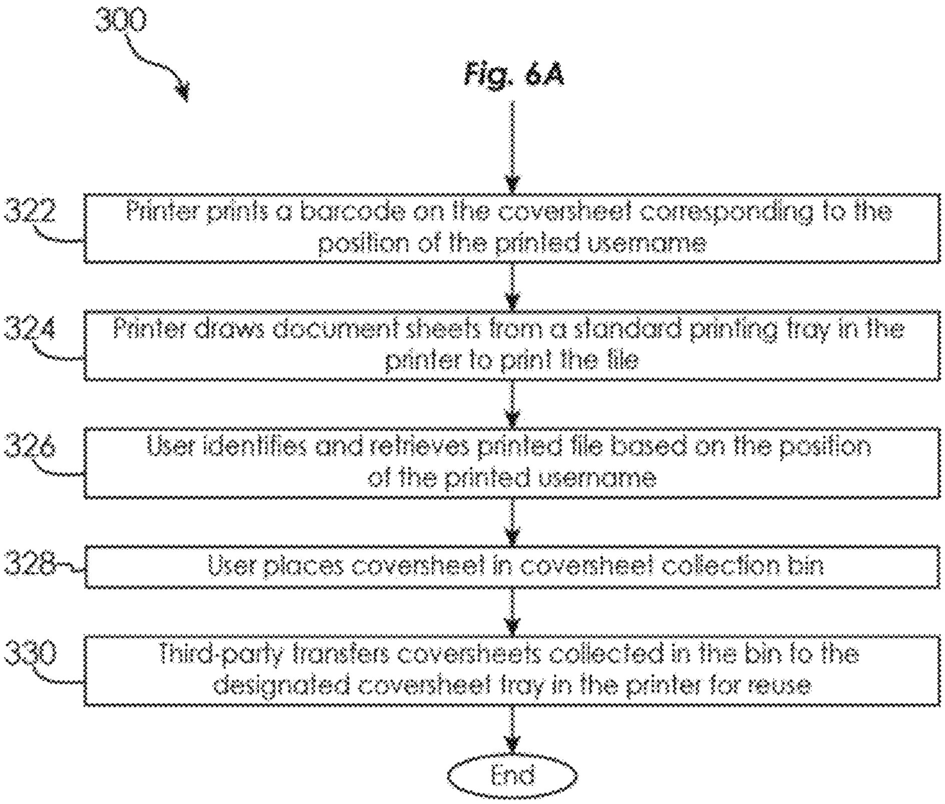

The example method 300 shown in FIGS. 6A and 6B includes steps 302 through 310 similar to steps 102 through 110 in FIG. 4, the discussion of which will not be repeated for the sake of brevity. At step 312, the printer's scanning device performs a barcode scan of the coversheet to locate any barcodes printed thereon. If it is determined that there is at least one barcode printed on the coversheet at step 314, the method moves through steps 316*b*, 318*b* and 320*b*. If it is determined that there are no barcodes printed on the coversheet at step 314, the method moves through step 316*a*. At step 316*a*, the printer prints the username associated with the particular print command at the first username indication position, such as position 52*a* for example. Otherwise, at step 316*b*, the printer scanning device scans the last-printed barcode on the coversheet to obtain information encoded in the barcode. In certain embodiments, the barcode may represent data corresponding to the number of usernames already printed on the coversheet. As an example, the particular barcode printed in the second barcode position 54*b* may represent data designed to inform the printer device that there are two usernames printed on the coversheet. At step 318*b*, the printer device determines which is the next-available username indication position at which to print the username on the coversheet based on information obtained from the barcode scan and then prints the username at the determined position at step 320*b*.

At step 322, the printer prints a barcode on the coversheet corresponding to the position of the printed username, the discussion of which will not be repeated for the sake of brevity. As an example, if the username is printed in the third username indication position 52*c*, the barcode may be printed in the corresponding third barcode position 54*c*. The remaining steps 324 through 330 in the method 300 are similar to steps 118 through 124 discussed above with respect to FIG. 4.

Accordingly, steps 324 through 330 will not be discussed in great detail for the sake of brevity.

Figure 7:
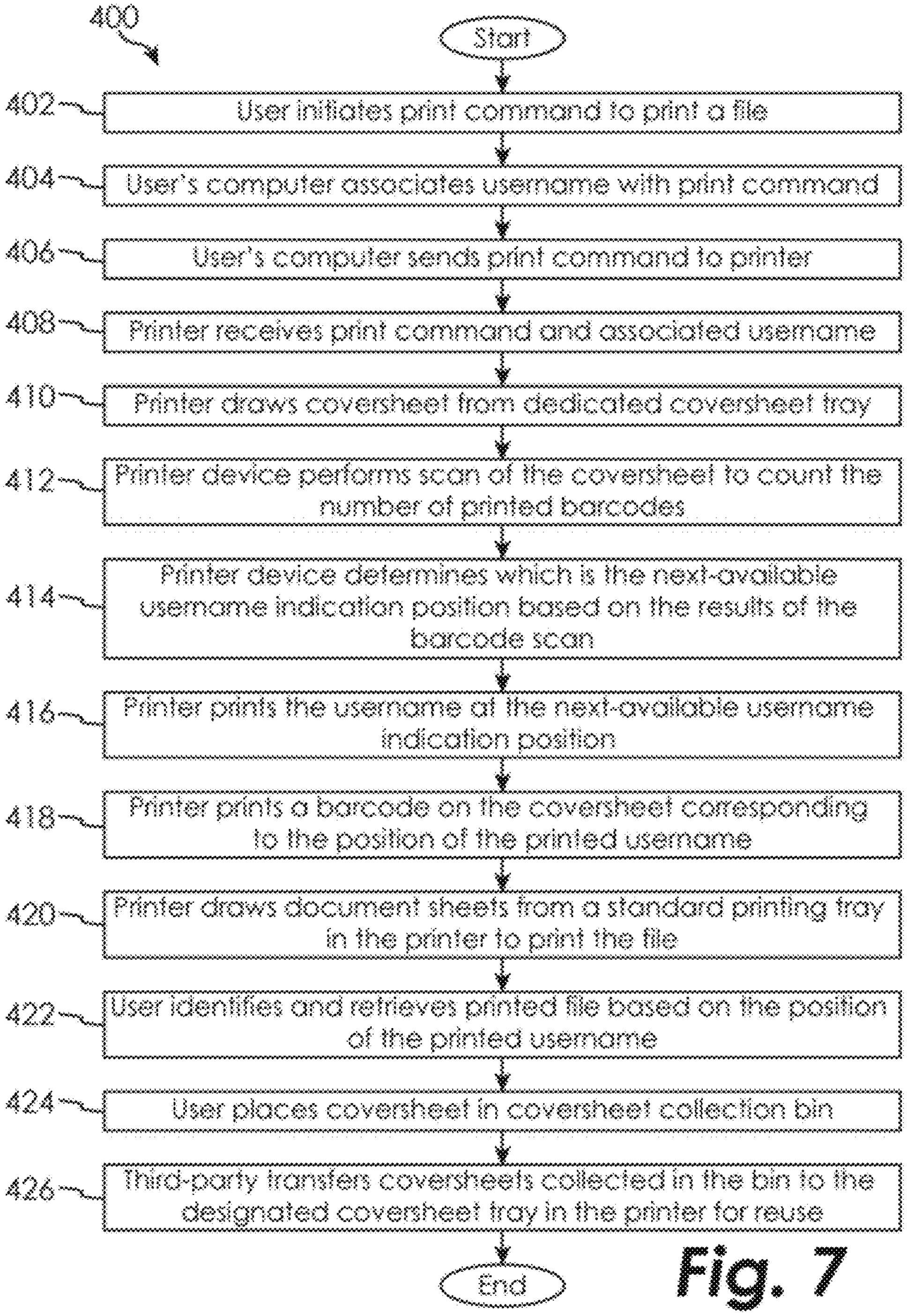

The example method 400 shown in FIG. 7 includes steps 402 through 410 similar to steps 102 through 110 in FIG. 4, the discussion of which will not be repeated for the sake of brevity. At step 412, the printer scanning device performs a barcode scan of the coversheet to count the number of barcodes printed thereon. At step 414, the printer device determines which is the next-available username indication position at which to print the username on the coversheet based on information obtained from the barcode scan. According to method 400, a scan of a certain number of barcodes may indicate to the printer that the same number of usernames have previously been printed on the coversheet. For example, if the barcode scan reveals that two barcodes have previously been printed on the coversheet, the printer may understand that to mean that two usernames have previously been printed on the coversheet and that the next-available username indication position is the third position, such as position 52*c* on coversheet 50. Accordingly, the printer then prints the username at the determined position at step 416. At step 418, the printer prints a barcode on the coversheet corresponding to the position of the printed username. The remaining steps 420 through 426 in the method 400 are similar to steps 118 through 124 discussed above with respect to FIG. 4. Accordingly, steps 420 through 426 will not be discussed in great detail for the sake of brevity.

Figure 8:
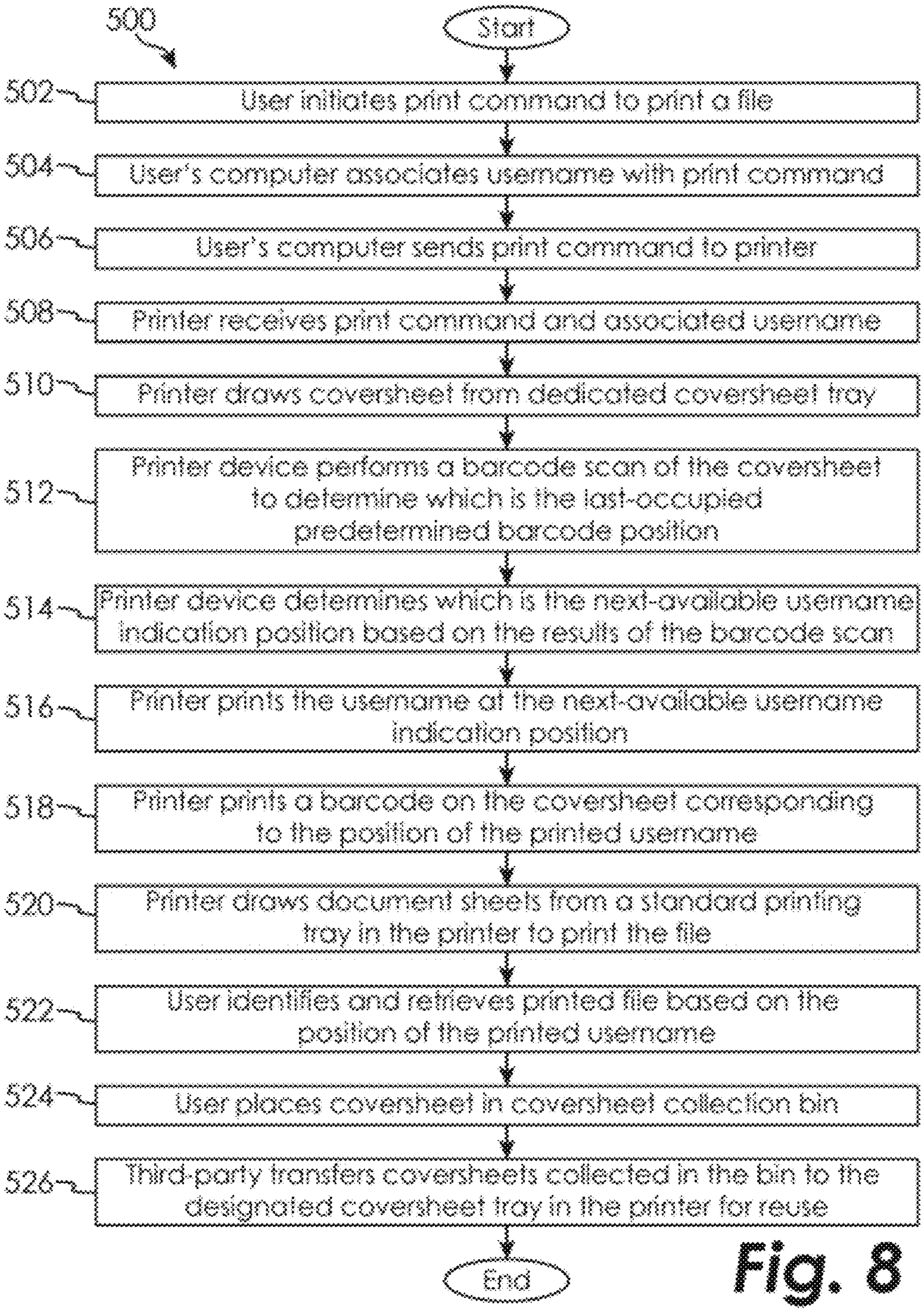

The example method 500 shown in FIG. 8 includes steps 502 through 510 similar to steps 102 through 110 in FIG. 4, the discussion of which will not be repeated for the sake of brevity. At step 512, the printer scanning device performs a barcode scan of the coversheet to determine which is the last-occupied predetermined barcode position. As an example, a scan of the coversheet 50 as shown in FIG. 2 would reveal that the last-occupied barcode position is position 54*b*. At step 514, the printer device determines which is the next-available username indication position at which to print the username on the coversheet based on information obtained from the barcode scan. In the above example, if the barcode scan reveals that the last-occupied position is the second predetermined barcode position 54*b*, the printer may understand that to mean that two usernames have previously been printed on the coversheet and that the next-available username indication position is the third position, such as position 52*c* on coversheet 50. Accordingly, the printer then prints the username at the determined position at step 516. At step 518, the printer prints a barcode on the coversheet corresponding to the position of the printed username. The remaining steps 520 through 526 in the method 500 are similar to steps 118 through 124 discussed above with respect to FIG. 4. Accordingly, steps 520 through 526 will not be discussed in great detail for the sake of brevity.

Figure 9:
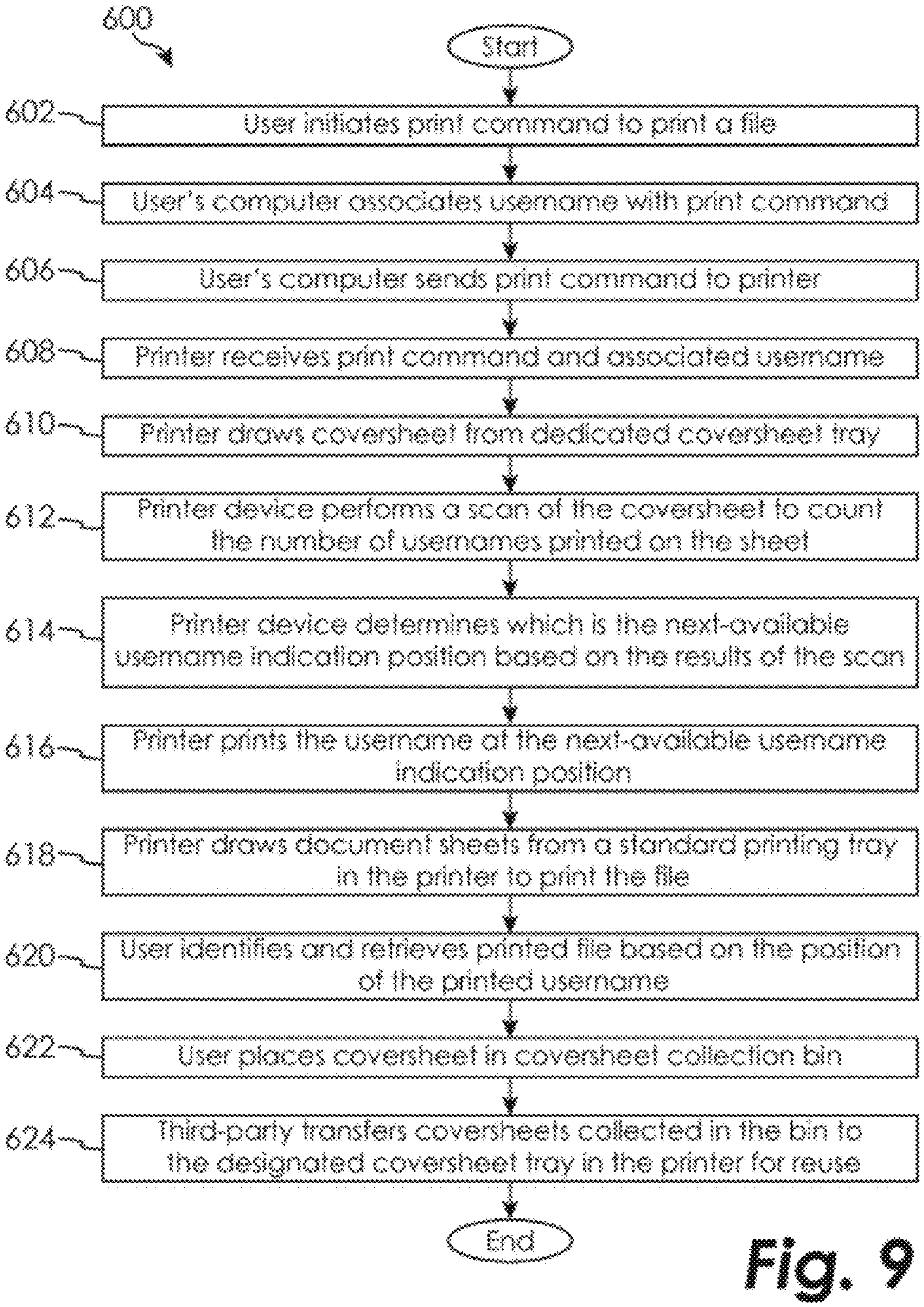

In certain embodiments the barcodes may be absent, as in the alternative example method 600 shown in FIG. 9. In such embodiments, the printer device may scan the previously printed usernames to determine where to print the next username on the coversheet. Method 600 includes steps 602 through 610 similar to steps 102 through 110 in FIG. 4, the discussion of which will not be repeated for the sake of brevity. At step 612, the printer's scanning device performs a scan of the coversheet to count the number of usernames printed on the coversheet. As an example, a scan of the coversheet 50 as shown in FIG. 2 would reveal that two usernames have previously been printed on the coversheet. At step 614, the printer device determines which is the next-available username indication position at which to print the username on the coversheet based on information obtained from the scan. In the above example, if the scan reveals that two usernames have been printed on the coversheet, the printer device may determine that the next-available username indication position is the third position, such as position 52*c* on coversheet 50. Accordingly, the printer then prints the username at the determined position at step 616. The remaining steps 618 through 624 in the method 600 are similar to steps 118 through 124 discussed above with respect to FIG. 4. Accordingly, steps 618 through 624 will not be discussed in great detail for the sake of brevity.

While the disclosure has been illustrated and described in detail in the drawings and foregoing description, the same is to be considered as illustrative and not restrictive in character, it being understood that only the preferred embodiment has been shown and described and that all changes and modifications that come within the spirit of the disclosure are desired to be protected.

What is claimed is:

1. A method for providing multiple uses of printer coversheets, comprising:

(a) providing a printer having a dedicated coversheet tray, at least one document sheet tray, and a scanning device;

(b) receiving a print command from a user through the user's computer device, the user having a corresponding username, the username being associated with the print command, and the print command instructing the printer to print a file;

(c) drawing a coversheet from the dedicated coversheet tray to be positioned adjacent the printed file, the coversheet having a plurality of predetermined username indication positions at which the printer is operable to print usernames corresponding to print commands and a corresponding plurality of predetermined barcode positions located separately from the plurality of predetermined username indication positions on the coversheet, at which the printer is operable to print one or more barcodes having data encoded therein, the data corresponding to a username indication position;

(d) the scanning device performing a barcode scan of at least one barcode printed on the coversheet to obtain data from the scanned barcode corresponding to a username indication position;

(e) determining at which username indication position to print the username on the coversheet based on the data obtained from the barcode scan at step (d);

(f) printing the username at a next-available one of the username indication positions on the coversheet based on the determination made at step (e), and (g) printing a barcode on the coversheet at the one of the barcode positions, the barcode having data encoded therein, the data corresponding to the username indication position at which the username is printed at step (f).

2. The method of claim 1, wherein the user's computer device automatically associates the user's username with the print command.

3. The method of claim 1, wherein the scanning device is encoded with logic executable by one or more processors within the scanning device to perform steps (d) and (e).

4. The method of claim 1, further comprising the user identifying the printed file based on the indicated positioning of the printed username in step (f) and retrieving the printed file from the printer.

5. The method of claim 4, further comprising the user placing the coversheet into a coversheet collection bin.

6. The method of claim 5, further comprising transferring the coversheet from the coversheet collection bin to the dedicated coversheet tray of the printer.

7. The method of claim 1, further comprising drawing at least one document sheet from the document sheet tray on which to print the file.

8. The method of claim 1, further comprising drawing at least one coversheet sheet from the dedicated coversheet tray on which to print the file.

9. The method of claim 1, wherein step (d) includes the scanning device performing a barcode scan of the barcode positioned in the last-occupied one of the predetermined barcode positions, the barcode representing data corresponding to the number of usernames previously printed on the coversheet.

10. The method of claim 1, wherein step (d) includes the scanning device performing a barcode scan of all of the barcodes printed on the coversheet to count a number of barcodes printed on the coversheet, wherein the number of barcodes printed on the coversheet directly corresponds to the number of usernames previously printed on the coversheet.

11. The method of claim 1, wherein step (d) includes the scanning device performing a barcode scan of all of the barcodes printed on the coversheet to determine the next-available one of the predetermined barcode positions.

12. A method for providing multiple uses of printer coversheets, comprising:

(a) providing a printer having a dedicated coversheet tray, at least one document sheet tray, and a scanning device;

(b) receiving a print command from a user through the user's computer device, the user having a corresponding username, the username being associated with the print command, and the print command instructing the printer to print a file;

(c) drawing a coversheet from the dedicated coversheet tray to be positioned adjacent the printed file, the coversheet having a plurality of predetermined username indication positions at which the printer is operable to print usernames corresponding to print commands and a corresponding plurality of predetermined barcode positions located separately from the plurality of predetermined username indication positions on the coversheet, at which the printer is operable to print barcodes having data encoded therein, the data corresponding to a number of usernames printed on the coversheet;

(d) the scanning device performing a barcode scan of a barcode positioned in a last occupied one of the predetermined barcode positions, to read the data encoded in the barcode corresponding to the number of usernames previously printed on the coversheet;

(e) determining a next-available username indication position based on the data read from the barcode scanned at step (d);

(f) printing the username at the next-available one of the username indication positions determined at step (e), and (g) printing a barcode on coversheet at the one of the barcode positions, the barcode having data encoded therein, the data corresponding to the next-available username indication position at which the username is printed at step (f).

13. The method of claim 12, wherein the user's computer automatically associates the 5 user's username with the print command.

14. The method of claim 12, wherein the scanning device is encoded with logic executable by one or more processors within the device to perform steps (d) and (e).

15. The method of claim 12, further comprising drawing at least one coversheet sheet from the dedicated coversheet tray on which to print the file.

16. An apparatus, comprising: a device encoded with logic executable by one or more processors to:

receive a print command to print a file, the print command having an associated username;

direct that a coversheet be drawn from a dedicated coversheet tray to be positioned adjacent the printed file, the coversheet having a plurality of predetermined username indication positions at which a printer is operable to print usernames corresponding to print commands and a corresponding plurality of predetermined barcode positions located separately from the plurality of predetermined username indication positions on the coversheet, at which the printer is operable to print one or more barcodes having data encoded therein, the data corresponding to a username indication position;

perform a barcode scan of at least one barcode printed on the coversheet to obtain data from the scanned barcode corresponding to a username indication position;

determine location at which to print the username on the coversheet based on the data obtained from the barcode scan;

direct the printing of the username on the coversheet at the determined location; and direct the printing of a barcode having data encoded thereon corresponding to the determined location of the printed username on the coversheet.

17. The apparatus of claim 16, wherein the coversheet includes a plurality of predetermined username indication positions at which the printer is operable to print usernames corresponding to print commands and a corresponding plurality of predetermined barcode positions at which the printer is operable to print barcodes.

18. The apparatus of claim 17, wherein the barcode scan includes a scan of the barcode positioned in a last-occupied one of the predetermined barcode positions, the barcode representing data corresponding to a number of usernames previously printed on the coversheet.

19. The apparatus of claim 16, wherein the barcode scan includes a scan of all of the barcodes printed on the coversheet to count a number of barcodes printed on the coversheet, wherein the number of barcodes printed on the coversheet directly corresponds to the number of usernames previously printed on the coversheet.

20. The apparatus of claim 16, wherein the barcode scan includes a scan of all of the barcodes printed on the coversheet to determine a next-available one of the predetermined barcode positions.

* * * * *